(12) United States Patent
Tateishi et al.

(10) Patent No.: US 11,333,602 B2
(45) Date of Patent: May 17, 2022

(54) FLUID MEASURING APPARATUS

(71) Applicants:PIONEER CORPORATION, Tokyo (JP); NIKKISO COMPANY LIMITED, Tokyo (JP)

(72) Inventors: Kiyoshi Tateishi, Saitama (JP); Wataru Onodera, Saitama (JP); Tomoya Murakami, Shizuoka (JP); Akari Agata, Shizuoka (JP); Genki Adachi, Shizuoka (JP)

(73) Assignees: PIONEER CORPORATION, Tokyo (JP); NIKKISO COMPANY LIMITED, Tokyo (JP)

( * ) Notice: Subject to any disclaimer, the term of this patent is extended or adjusted under 35 U.S.C. 154(b) by 599 days.

(21) Appl. No.: 16/344,669

(22) PCT Filed: Oct. 25, 2016

(86) PCT No.: PCT/JP2016/081623
§ 371 (c)(1),
(2) Date: Apr. 24, 2019

(87) PCT Pub. No.: WO2018/078727
PCT Pub. Date: May 3, 2018

(65) Prior Publication Data
US 2020/0056990 A1  Feb. 20, 2020

(51) Int. Cl.
*G01N 21/53* (2006.01)
*G01N 21/85* (2006.01)
*G01F 1/00* (2022.01)

(52) U.S. Cl.
CPC .............. *G01N 21/53* (2013.01); *G01F 1/00* (2013.01); *G01N 21/85* (2013.01)

(58) Field of Classification Search
CPC ........... G01N 21/53; G01N 21/85; G01F 1/00
See application file for complete search history.

(56) References Cited

U.S. PATENT DOCUMENTS 8,034,296 B2  10/2011 Cox et al.
8,531,664 B2   9/2013 Nagaike
(Continued)

FOREIGN PATENT DOCUMENTS

CN  102426159 A  4/2012
EP  0 575 712 A2  12/1993
(Continued)

OTHER PUBLICATIONS

International Search Report, PCT/JP2016/081623, dated Jan. 24, 2017.
(Continued)

*Primary Examiner* — Shawn Decenzo
*Assistant Examiner* — Amanda Merlino
(74) *Attorney, Agent, or Firm* — Nixon & Vanderhye

(57) ABSTRACT

A fluid measuring apparatus is provided with: an irradiating device configured to irradiate a fluid with light; a light receiving device configured to receive light scattered by the fluid; a detecting device configured to detect a backflow of the fluid on the basis of a received light signal of the light receiving device; and a calculating device configured to calculate estimated concentration information indicating a concentration of the fluid, on the basis of a detection result of the detecting device and the received light signal of the light receiving device. By this, even if the backflow temporarily occurs in the fluid, the fluid concentration can be accurately measured.

11 Claims, 12 Drawing Sheets

(56) References Cited

U.S. PATENT DOCUMENTS

| | | |
|---|---|---|
| 2007/0003434 A1 | 1/2007 | Padmanabhan |
| 2007/0031289 A1 | 2/2007 | Cox et al. |
| 2010/0276367 A1 | 11/2010 | Zhang |
| 2011/0216318 A1 | 9/2011 | Nagaike |
| 2013/0144139 A1 | 6/2013 | Zhang et al. |

FOREIGN PATENT DOCUMENTS

| | | |
|---|---|---|
| EP | 2 837 327 A1 | 2/2015 |
| JP | 56-79238 | 6/1981 |
| JP | 2009-500612 | 1/2009 |
| JP | 2011-180015 | 9/2011 |
| JP | 2012-040058 A | 3/2012 |
| JP | 5586476 | 9/2014 |

OTHER PUBLICATIONS

Masato Yanoura et al., "CHDF ni Okeru Atsu Monitor Line no Ketsueki Gyakuryu Kanshi Sensor no Shisaku", Medical Journal of Asahi General Hospital, Oct. 1, 2008 (Oct. 1, 2008), vol.30, ISSN:0285-9017, pp. 26 to 28, entire text.

Extended European Search Report issued in European Patent Application No. 16920392.4 dated Apr. 30, 2020.

FLUID MEASURING APPARATUS

TECHNICAL FIELD

The present invention relates to a fluid measuring apparatus configured to measure information about a fluid by irradiating the fluid with light.

BACKGROUND ART

For this type of apparatus, there is known an apparatus configured to irradiate a fluid with light and to receive scattered light, thereby measuring a fluid concentration, a flow volume, a flow velocity, and the like. For example, Patent Literature 1 discloses a technology/technique in which a blood flowing in an artificial dialysis apparatus is irradiated with light to measure a blood concentration (or a hematocrit value) and a blood flow volume.

CITATION LIST

Patent Literature
Patent Literature 1: Japanese Patent No. 5586476

SUMMARY OF INVENTION

Technical Problem

In the artificial dialysis apparatus, a blood collected from a patient flows in a tube by a power of a pump; however, the blood may temporarily flow backward in the tube because of characteristics of the pump. As a result, the measurement using the light may not be accurately performed.

In the aforementioned Patent Literature 1, there is no description about a backflow of the blood. Thus, if the backflow of the blood occurs, the blood concentration and the blood flow volume cannot be accurately measured, which is technically problematic.

The above is an example of problems to be solved by the present invention. It is therefore an object of the present invention to provide a fluid measuring apparatus configured to accurately measure information about a fluid.

Solution to Problem

The above object of the present invention can be achieved by a first fluid measuring apparatus provided with: an irradiating device configured to irradiate a fluid with light; a light receiving device configured to receive light scattered by the fluid; a detecting device configured to detect a backflow of the fluid on the basis of a received light signal of the light receiving device; and a calculating device configured to calculate estimated concentration information indicating a concentration of the fluid, on the basis of a detection result of the detecting device and the received light signal of the light receiving device.

The above object of the present invention can be achieved by a second fluid measuring apparatus provided with: an irradiating device configured to irradiate a fluid with light; a light receiving device configured to receive light scattered by the fluid; a detecting device configured to detect that a change amount of received light intensity indicated by a received light signal of the light receiving device is greater than or equal to a predetermined value; and a calculating device configured to calculate estimated concentration information indicating a concentration of the fluid, on the basis of a detection result of the detecting device and the received light signal of the light receiving device.

DESCRIPTION OF EMBODIMENTS

<1>

Figure 1:
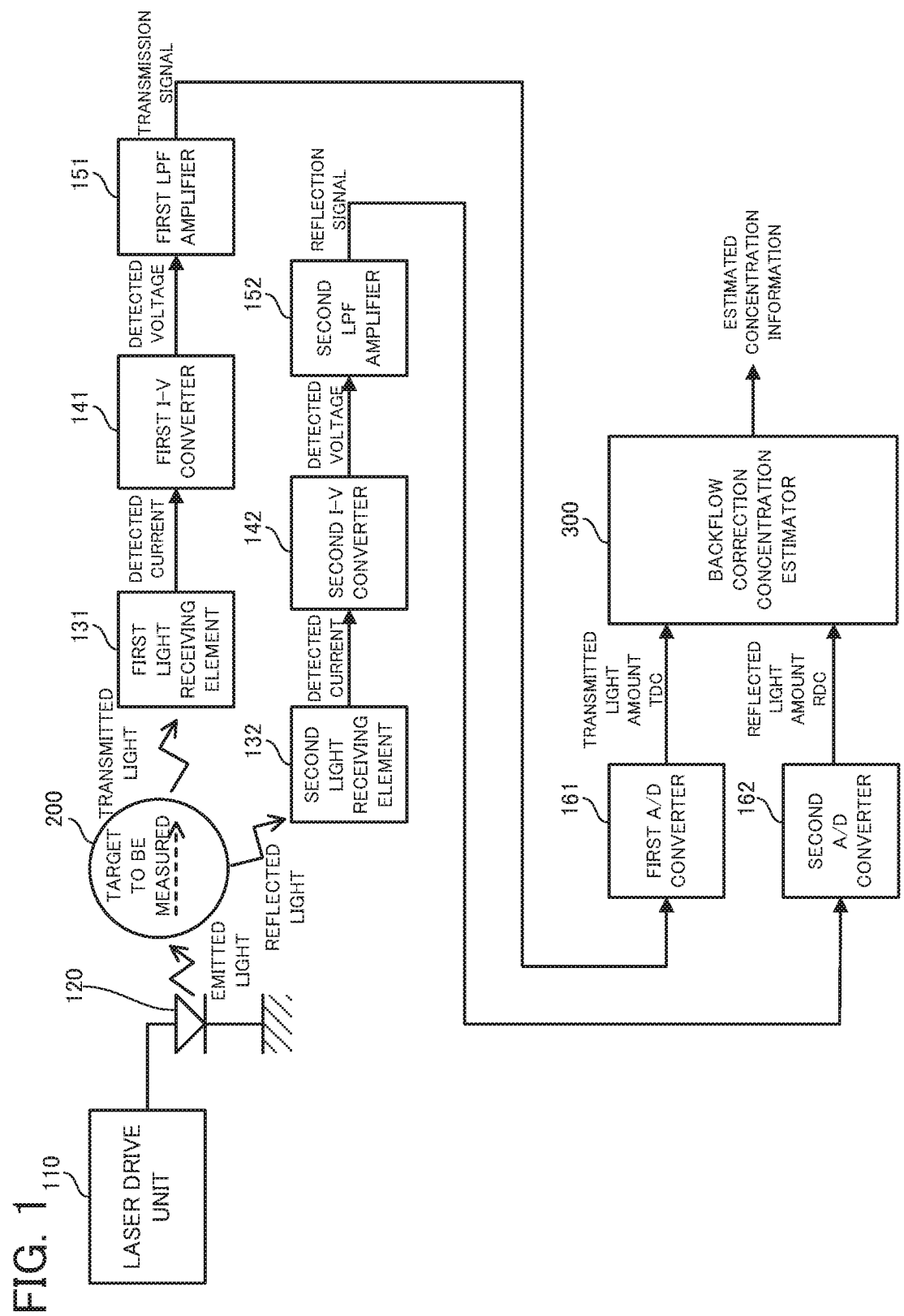
FIG. 1 is a schematic diagram illustrating an entire configuration of a fluid measuring apparatus according to a first practical example.

A first fluid measuring apparatus according to an embodiment is provided with: an irradiating device configured to irradiate a fluid with light; a light receiving device configured to receive light scattered by the fluid; a detecting device configured to detect a backflow of the fluid on the basis of a received light signal of the light receiving device; and a calculating device configured to calculate estimated concentration information indicating a concentration of the fluid, on the basis of a detection result of the detecting device and the received light signal of the light receiving device.

In operation of the first fluid measuring apparatus according to the embodiment, the light is applied to the fluid from the irradiating device. The applied light is, for example, laser light, and the light is applied by using a Fabry-Perot (FP) laser light source and a distributed feedback laser light source. Moreover, a specific example of the fluid is a blood or the like. Anything that flows and can be irradiated with the light from the irradiating device could be a measurement target.

The light applied from the irradiating device is scattered (i.e., transmitted or reflected) in the fluid, and is then received on the light receiving device. The light receiving device is configured to be, for example, a photo diode, and is configured to detect the intensity of the light, and to output the received light signal (i.e., the signal indicating the intensity of the received light).

The intensity of the light scattered in the fluid varies depending on a state of the fluid. It is thus possible to measure the information about the fluid (e.g., the concentration, etc.) by using the intensity of the light received on the light receiving device.

Particularly in the embodiment, the backflow of the fluid can be detected on the detecting device. The "backflow" herein may mean that the fluid flows in a different direction from the original, which may include a temporal flow or a partial flow. The detecting device is configured to detect the backflow of the fluid on the basis of the received light signal outputted from the light receiving device.

The detection result regarding the backflow of the fluid is used to calculate the estimated concentration information indicating the concentration of the fluid, together with the received light signal outputted from the light receiving device. The calculating device configured to calculate the estimated concentration information is configured to estimate the concentration of the fluid, for example, on the basis of whether or not the backflow occurs in the fluid, and on the basis of the intensity of the light indicated by the received light signal.

Here, if the information about the backflow of the fluid is not detected, it is hard to accurately calculate the estimated concentration information. According to studies by the present inventors, it has been found that the intensity of the scattered light from the fluid changes, temporarily significantly, if the backflow occurs in the fluid. Thus, if the concentration of the fluid is estimated only on the basis of the received light signal, the concentration may be erroneously estimated when the backflow occurs.

In the embodiment, however, as described above, the estimated concentration information is calculated on the basis of the detection result of the detecting device and the received light signal of the light receiving device. In other words, the concentration of the fluid is estimated in view of the occurrence of the backflow. Therefore, according to the fluid measuring apparatus in the embodiment, it is possible to accurately estimate the concentration of the fluid.

<2>

In one aspect of the fluid measuring apparatus according to the embodiment, the detecting device is configured to detect the backflow of the fluid if a change amount of received light intensity indicated by the received light signal is greater than or equal to a predetermined value.

According to this aspect, it is possible to detect the backflow of the fluid by comparing the change amount of the received light intensity with the predetermined value. The "predetermined value" may be a value set in accordance with the change amount of the received light intensity when the fluid flows backward, and may be obtained and set in advance, theoretically, experimentally, or experientially.

<3>

In another aspect of the fluid measuring apparatus according to the embodiment, the calculating device is configured (i) to calculate the estimated concentration information on the basis of the received light signal in a period other than a backflow period in which the backflow of the fluid is detected, and (ii) to calculate the estimated concentration information on the basis of a corrected signal obtained by correcting the received light signal in the backflow period.

According to this aspect, in the period other than the backflow period, the estimated concentration information is calculated on the basis of the received light signal. In the backflow period, the estimated concentration information is calculated on the basis of the corrected signal obtained by correcting the received light signal.

As explained above, in the backflow period, the intensity of the scattered light changes, temporarily significantly. Thus, even if the received light signal is used without a change to estimate the concentration, there is a possibility that an accurate value cannot be obtained. In contrast, if the corrected signal is used in the backflow period, it is possible to suppress an influence of the change in the received light intensity due to the backflow, and to accurately estimate the concentration.

A method of generating the correcting signal may include, for example, a filtering process using a low pass filter, or the like.

<4>

In another aspect of the fluid measuring apparatus according to the embodiment, the calculating device is configured to calculate first concentration information on the basis of the received light signal and calculate second concentration information by correcting the first concentration information, (i) to output the first concentration information as the estimated concentration information in a period other than a backflow period in which the backflow of the fluid is detected, and (ii) to output the second concentration information as the estimated concentration information in the backflow period.

According to this aspect, the first concentration information is firstly calculated on the basis of the received light signal, and the second concentration information is further calculated by correcting the first concentration information. In other words, the two types of concentration information are separately calculated, regardless of whether or not the backflow occurs. A method of calculating the second concentration information may include, for example, a filtering process using a low pass filter, or the like.

If the first concentration information and the second concentration information are calculated, the occurrence of the backflow is detected. Then, in the period other than the backflow period, the first concentration information (i.e., the concentration information calculated on the basis of the received light signal) is outputted as the estimated concentration information. On the other hand, in the backflow period, the second concentration information (i.e., the concentration information obtained by correcting the first concentration information) is outputted as the estimated concentration information.

As described above, it is possible to suppress the influence of the change in the received light intensity due to the backflow, and to output the estimated concentration information that is accurate, by outputting the second concentration information obtained by the correction in the backflow period.

<5>

In another aspect of the fluid measuring apparatus according to the embodiment, the calculating device is configured (i) to calculate first concentration information based on the received light signal, a plurality of times, in a predetermined period, and (ii) to output an average value of only the first concentration information calculated in a period other than a backflow period in which the backflow of the fluid is detected, out of the first concentration information calculated the plurality of times, as the estimated concentration information in the predetermined period.

According to this aspect, out of the first concentration information calculated the plurality of times, only values calculated in the period other than the backflow period are used to calculate the estimated concentration information. In other words, values calculated in the backflow period are not used to calculate the estimated concentration information.

As a result, the first concentration information calculated as a wrong value due to the backflow does not influence the estimated concentration information. It is thus possible to eliminate the influence by the backflow, and to accurately calculate the estimated concentration information.

The "predetermined period" may be a period set as a period for calculating the estimated concentration information and can be set as an arbitrary period.

<6>

In another aspect of the fluid measuring apparatus according to the embodiment, the light receiving device includes: a first light receiving element placed to receive mainly transmitted light, which is transmitted through the fluid; and a second light receiving element placed to receive mainly reflected light, which is reflected by the fluid.

According to this aspect, the transmitted light and the reflected light can be separately received by the first light receiving element and the second light receiving element, respectively. It is thus possible to more preferably detect the backflow or to calculate the estimated concentration information by using respective characteristics of the transmitted light and the reflected light.

<7>

In an aspect in which the light receiving device includes the first light receiving element and the second light receiving element, the detecting device may detect the backflow of the fluid on the basis of the received light signal corresponding to the reflected light.

The reflected light has such a characteristic that the intensity is significantly reduced if the backflow occurs in the fluid. It is thus possible to preferably detect the backflow of the fluid by using the received light signal of the reflected light (i.e., the received light intensity of the reflected light).

<8>

Alternatively, in an aspect in which the light receiving device includes the first light receiving element and the second light receiving element, the calculating device may calculate the estimated concentration information on the basis of the detection result of said detecting device and the received light signal corresponding to the transmitted light.

The intensity of the transmitted light varies depending on the concentration of the fluid, with a one-to-one relation being maintained. It is thus possible to preferably calculate the estimated concentration information by using the received light signal of the transmitted light (i.e., the received light intensity of the transmitted light).

<9>

A second fluid measuring apparatus according to the embodiment is provided with: an irradiating device configured to irradiate a fluid with light; a light receiving device configured to receive light scattered by the fluid; a detecting device configured to detect that a change amount of received light intensity indicated by a received light signal of the light receiving device is greater than or equal to a predetermined value; and a calculating device configured to calculate estimated concentration information indicating a concentration of the fluid, on the basis of a detection result of the detecting device and the received light signal of the light receiving device.

According to the second fluid measuring apparatus in the embodiment, it is detected that the change amount of the received light intensity indicated by the received light signal of the light receiving device is greater than or equal to the predetermined value, and the estimated concentration information is calculated on the basis of the detection result. If the change amount of the received light intensity is greater than or equal to the predetermined value, it is hard to accurately estimate the concentration on the basis of the received light signal. Thus, if it can be detected that change amount of the received light intensity is greater than or equal to the predetermined value, it is possible to suppress deterioration in estimation accuracy of the concentration of the fluid.

Therefore, according to the second fluid measuring apparatus in the embodiment, as in the first fluid measuring apparatus in the embodiment described above, it is possible to accurately estimate the concentration of the fluid. The second fluid measuring apparatus in the embodiment can also adopt the same various aspects as those of the first fluid measuring apparatus in the embodiment described above.

The operation and other advantages of the fluid measuring apparatus according to the embodiments will be explained in more detail in the following practical example.

PRACTICAL EXAMPLES

Hereinafter, a fluid measuring apparatus according to practical examples will be explained in detail with reference to the drawings.

First Practical Example

A fluid measuring apparatus according to a first practical example will be explained with reference to FIG. 1 to FIG. 10. Hereinafter, an explanation will be given to an example in which the fluid measuring apparatus is configured to be an apparatus for measuring a blood flow concentration.

Entire Configuration

Firstly, with reference to FIG. 1, an entire configuration of the fluid measuring apparatus according to the first practical example will be explained. Here, FIG. 1 is a schematic diagram illustrating the entire configuration of the fluid measuring apparatus according to the first practical example.

In FIG. 1, the fluid measuring apparatus according to the first practical example is provided with a laser drive unit 110, a semiconductor laser 120, a first light receiving element 131, a second light receiving element 132, a first I-V converter 141, a second I-V converter 142, a first LPF amplifier 151, a second LPF amplifier 152, a first A/D converter 161, a second A/D converter 162, and a backflow correction concentration estimator 300.

The laser drive unit 110 is configured to generate an electric current for driving the semiconductor laser 120.

The semiconductor laser 120 is a specific example of the "irradiating device", and is configured to irradiate a target 200 to be measured (e.g., a blood flow, etc.) with laser light corresponding to a drive current generated on the laser drive unit 110.

The first light receiving element 131 and the second light receiving element 132 are a specific example of the "light receiving device", and are configured to receive scattered light scattered by a blood 200, out of the laser light emitted from the semiconductor laser 120. The first light receiving element 131 is configured to output a detected current in accordance with the intensity of transmitted light received, whereas the second light receiving element 132 is configured to output a detected current in accordance with the intensity of reflected light received.

The first I-V converter 141 and the second I-V converter 142 are respectively configured to convert the detected currents, which are outputted from the first light receiving element 131 and the second light receiving element 132, to voltages, and to output detected voltages.

The first LPF amplifier 151 and the second LPF amplifier 152 are respectively configured to remove high frequency components, which are unnecessary components including noise, from the detected voltages outputted from the first I-V converter 141 and the second I-V converter 142 as well as amplifying the detected voltages, and to output a transmission signal (i.e., a signal indicating information about the transmitted light) and a reflection signal (i.e., a signal indicating information about the reflected light).

The first A/D converter 161 and the second A/D converter 162 are respectively configured to quantize the transmission signal and the reflection signal, which are analog inputs, and to output them as digital data. The first A/D converter 161 is configured to output a transmitted light amount TDC, which indicates a light amount of the transmitted light, whereas the second A/D converter 162 is configured to output a reflected light amount RDC, which indicates a light amount of the reflected light.

The backflow correction concentration estimator 300 is configured to detect a backflow of the target 200 to be measured, on the basis of the reflected light amount RDC. The backflow correction concentration estimator 300 is also configured to calculate an estimated concentration of the target 200 to be measured, on the basis of a detection result of the backflow and the transmitted light amount TDC, and to output a result to an external apparatus (e.g., a display, etc.).

Configuration and Operation of Each Unit

Next, with reference to FIG. 2 to FIG. 8, the configuration and operation of each unit of the fluid measuring apparatus will be explained in detail.

Light Receiving Element and I-V Converter

Figure 2:
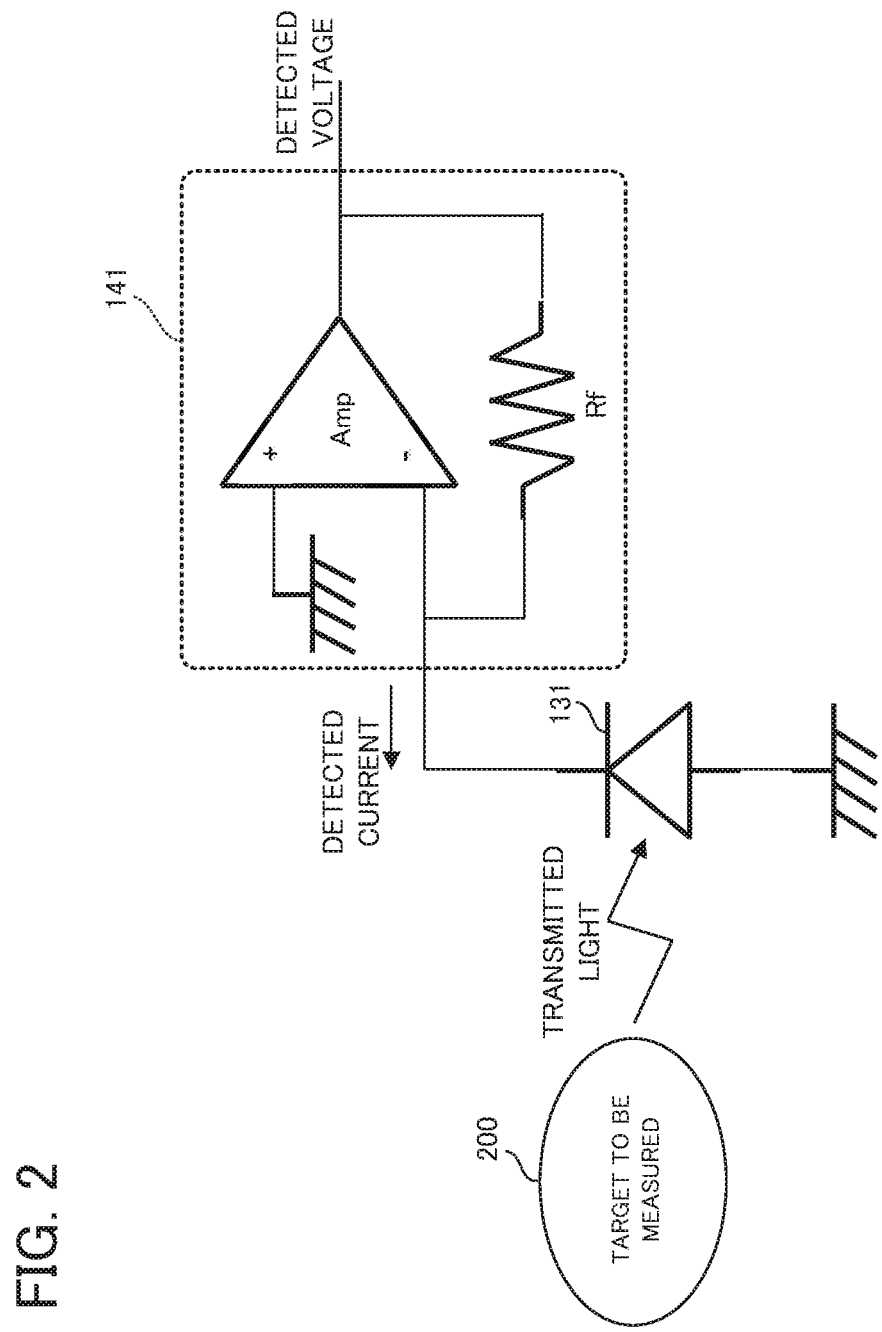
FIG. 2 is a circuit diagram illustrating a configuration of a first light receiving element and a first I-V converter.

With reference to FIG. 2, the configuration and operation of the light receiving element and the I-V converter will be explained. FIG. 2 is a circuit diagram illustrating the configuration of the first light receiving element and the first I-V converter.

As illustrated in FIG. 2, the transmitted light mainly including forward-scattered light out of the scattered light from the target 200 to be measured may be detected on the first light receiving element 131.

The first light receiving element 131 includes a photodetector by a semiconductor. An anode of the photodetector is connected to a ground potential, which is a reference potential, whereas a cathode of the photodetector is connected to an inverted terminal of an operational amplifier Amp. A non-inverted terminal of the operational amplifier Amp is connected to the ground potential, which is the reference potential.

A feedback resistor Rf is connected between the inverted terminal and an output terminal of the operational amplifier Amp. The operational amplifier Amp and the feedback resistor Rf constitute a so-called transimpedance amplifier. By a current-voltage converting action of the transimpedance amplifier (i.e., the first I-V converter) 141, the detected current is converted to the detected voltage.

This is not specifically illustrated, but the reflected light mainly including back-scattered light out of the scattered light from the target 200 to be measured may be detected by the second light receiving element 132 (refer to FIG. 1). The second light receiving element 132 includes a photodetector by a semiconductor. As in the first light receiving element 131, the transimpedance amplifier (i.e., the second I-V converter) 142 is provided.

Backflow Correction Concentration Estimator

Figure 3:
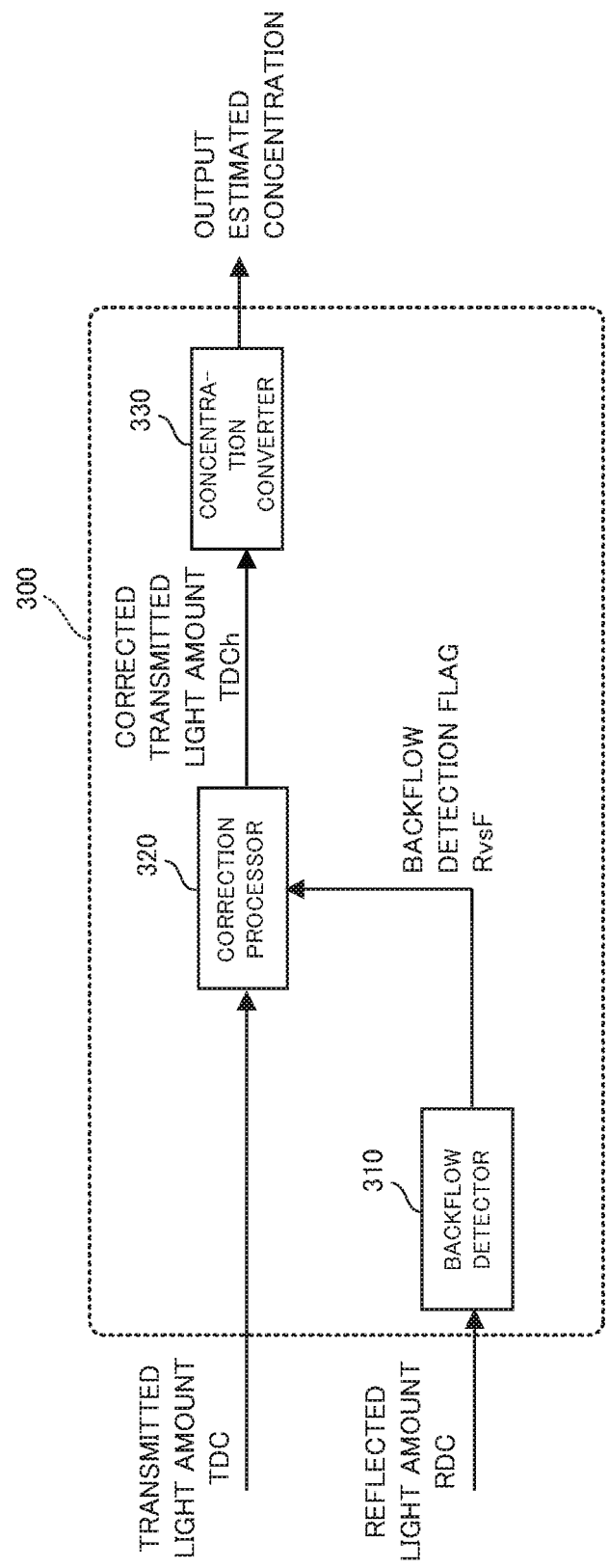
FIG. 3 is a block diagram illustrating a configuration of a backflow correction concentration estimator according to the first practical example.

With reference to FIG. 3, the configuration and operation of the backflow correction concentration estimator will be explained. FIG. 3 is a block diagram illustrating the configuration of the backflow correction concentration estimator according to the first practical example.

As illustrated in FIG. 3, the backflow correction concentration estimator 300 is provided with a backflow detector 310, a correction processor 320, and a concentration converter 330. The backflow detector 310 is a specific example of the "detecting device", and the correction processor 320 and the concentration converter 330 are a specific example of the "calculating device".

One of input parts of the backflow correction concentration estimator 300 is configured to receive an entry of the transmitted light amount TDC, which is a quantized digital value. The other input part of the backflow correction concentration estimator 300 is configured to receive an entry of the reflected light amount RDC, which is a quantized digital value.

The reflected light amount RDC is inputted to the backflow detector 310. The backflow detector 310 is configured to determine that the target 200 to be measured flows backward if there is a rapid temporal change in the reflected light amount RDC. From the backflow detector 310, a backflow detection flag RvsF, which is a detection result, is outputted, and is inputted to a control input part of the correction processor 320.

The correction processor 320 is configured to receive an entry of the transmitted light amount TDC, which is a quantized digital value, in addition to an entry of the backflow detection flag RvsF. The correction processor 320 is configured to correct the transmitted light amount TDC in accordance with the backflow detection flag RvsF, and to output a corrected transmitted light amount TDCh to the concentration converter 330.

The concentration converter 330 is configured to estimate a concentration of the target 200 to be measured, in accordance with the corrected transmitted light amount TDCh and to output the estimated concentration.

Backflow Detector

Figure 4:
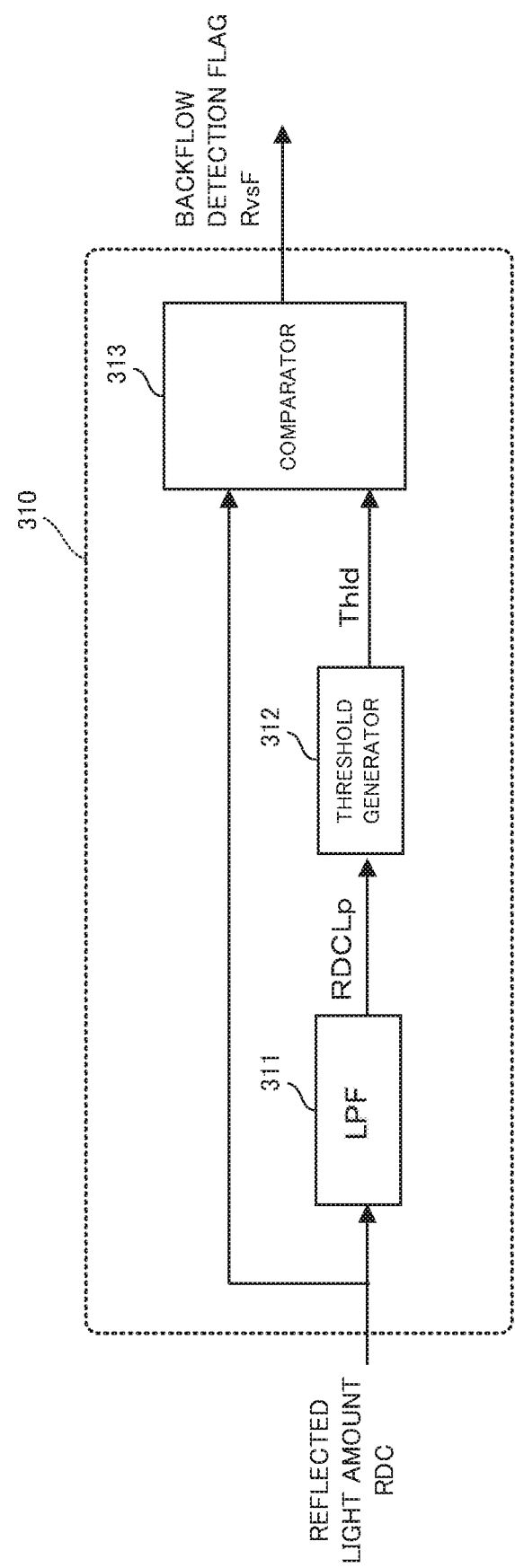
FIG. 4 is a block diagram illustrating a configuration of a backflow detector.

With reference to FIG. 4, the configuration and operation of the backflow detector will be explained. FIG. 4 is a block diagram illustrating the configuration of the backflow detector.

As illustrated in FIG. 4, the backflow detector 310 is provided with a low pass filter (LPF) 311, a threshold generator 312, and a comparator 313.

The reflected light amount RDC inputted to the backflow detector 310 is averaged by the LPF 311 to obtain a reflected light amount average value RDCLp. The RDCLp is outputted to the threshold generator 312.

The threshold generator 312 is configured to multiply the inputted past reflected light amount average value RDCLp by a predetermined coefficient (e.g., 0.9) to generate a threshold value Thld. The threshold value Thld is a specific example of the "predetermined value", and is generated as a value for detecting a rapid change in the reflected light amount RDC.

The comparator 313 is configured to receive an entry of the reflected light amount RDC that does not pass through the LPF 311, and an entry of the threshold value Thld. The comparator 313 is configured to detect a rapid reduction in the reflected light amount RDC by comparing magnitude between the reflected light amount RDC and the threshold value Thld. If the rapid reduction in the reflected light amount RDC is detected, it is determined that the backflow occurs, and a backflow detection flag RvsF=1 is outputted from the comparator 313. On the other hand, if the rapid reduction in the reflected light amount RDC is not detected (i.e., the temporal change in the reflected light amount RDC is mild and the change is small), it is determined that the backflow does not occur, and a backflow detection flag RvsF=0 is outputted from the comparator 313.

Correction Processor

Figure 5:
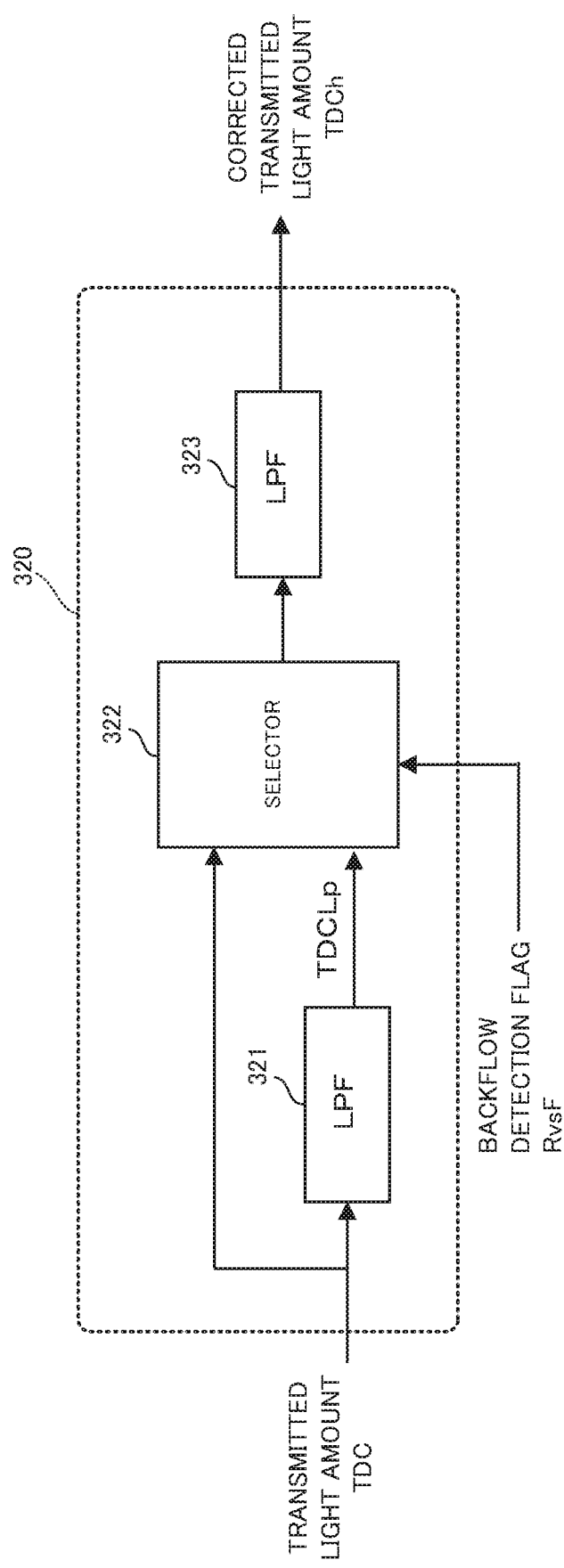
FIG. 5 is a block diagram illustrating a configuration of a correction processor.

With reference to FIG. 5, the configuration and operation of the correction processor will be explained. FIG. 5 is a block diagram illustrating the configuration of the correction processor.

As illustrated in FIG. 5, the correction processor 320 is provided with a LPF 321, a selector 322, and a LPF 323.

The transmitted light amount TDC inputted to the correction processor 320 is averaged by the LPF 321 to obtain a transmitted light amount average value TDCLp. The transmitted light amount TDC that is not averaged vertically changes in a short cycle in a period in which the backflow occurs, and is observed being in a state in which a random signal is applied thereto (e.g. refer to FIG. 6, etc.). This is supposedly because when the backflow occurs, the flow is disturbed in the process of changing from a forward flow to the backflow to cause a turbulent flow, resulting in a rapid temporal variation in the transmitted light amount. In contrast, the TDCLp has a mild temporal change and a stable level, even in the period in which the backflow occurs, due to the averaging action by the LPF 321.

The selector 322 is configured to receive an entry of the transmitted light amount TDC, an entry of the TDCLp, and an entry of the backflow detection flag RvsF. The selector 322 is configured to selectively output the averaged TDCLp in a period in which RvsF=1 is inputted (i.e., in the period in which the backflow occurs), and to selectively output the transmitted light amount TDC that does not pass through the LPF 321 in a period in which RvsF=0 is inputted (i.e., in a period in which the backflow does not occur). Due to the selective action of the selector 322, the transmitted light amount TDC to which a random noise is applied is removed and replaced by the TDCLp. Thus, an output signal of the selector 322 is a signal from which the noise caused by the backflow is removed.

The output signal of the selector 322 is averaged by the LPF 323 and is outputted as the corrected transmitted light amount TDCh. The averaging on the LPF 323 reduces the noise generated in selectively changing on the selector 322.

Specific Example of Backflow Detection and Correction Process

Figure 6:
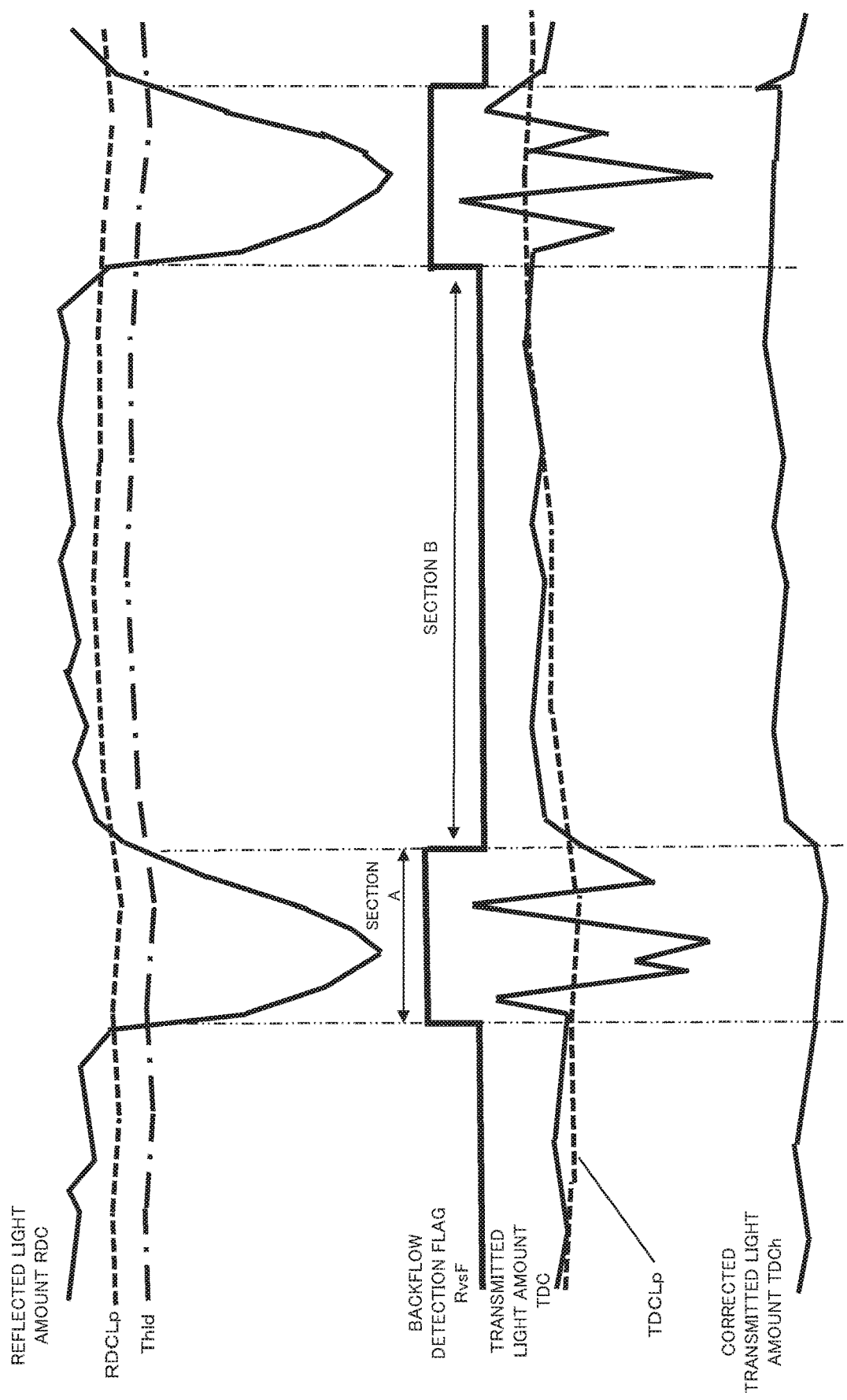
FIG. 6 is a graph illustrating an example of a temporal variation in each signal regarding a light amount.

With reference to FIG. 6, the backflow detection performed by the backflow detector 310 and the correction process performed by the correction processor 320 will be more specifically explained. FIG. 6 is a graph illustrating an example of a temporal variation in each signal regarding the light amount.

The blood, which is the target 200 to be measured according to the first practical example, flows in a tube by a power of a tube pump (not illustrated). The tube pump transfers the fluid in the tube, by a plurality of rollers squeezing the tube by rotation. From the structural viewpoint of the pump, pulsation occurs in synchronization with the rotation. The pulsation may cause the backflow of the blood. Specifically, the fluid repeatedly flows backward and forward, and is generally transferred in a forward direction; however, there is a section in which the fluid moves in an opposite direction due to the backflow for a short time in synchronization with the rotation. If the backflow occurs, it is considered that a compressional wave in a fluid concentration caused by the pulsation of the pump changes from being dense to being sparse, which causes a rapid reduction in the reflected light amount, which is the light amount of the scattered light, for example, the back-scattered light.

In FIG. 6, in a section A, the reflected light amount RDC rapidly decreases beyond the threshold value Thld, so that the backflow supposedly occurs. Thus, in the section A, not the transmitted light amount TDC but the averaged TDCLp is outputted as the corrected transmitted light amount TDCh, which is the output of the correction processor 320. In this manner, it is possible to reduce an influence of the noise generated in the transmitted light amount TDC due to the backflow. In contrast, in a section B, the reflected light amount RDC has a mild temporal change, so that the flow is supposedly in a stable dense state and the backflow supposedly does not occur. Thus, in the section B, the transmitted light amount TDC is outputted without a change as the corrected transmitted light amount TDCh, which is the output of the correction processor 320.

Concentration Converter

Figure 7:
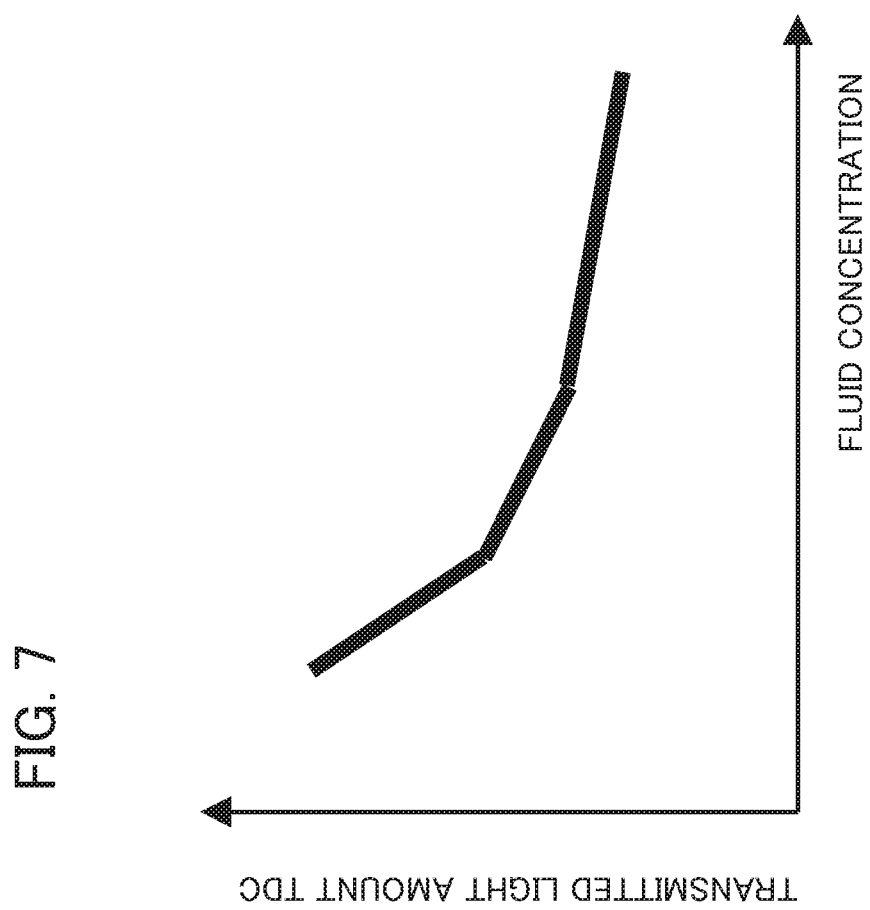
FIG. 7 is a graph illustrating a relation between a fluid concentration and a transmitted light amount.
Figure 8:
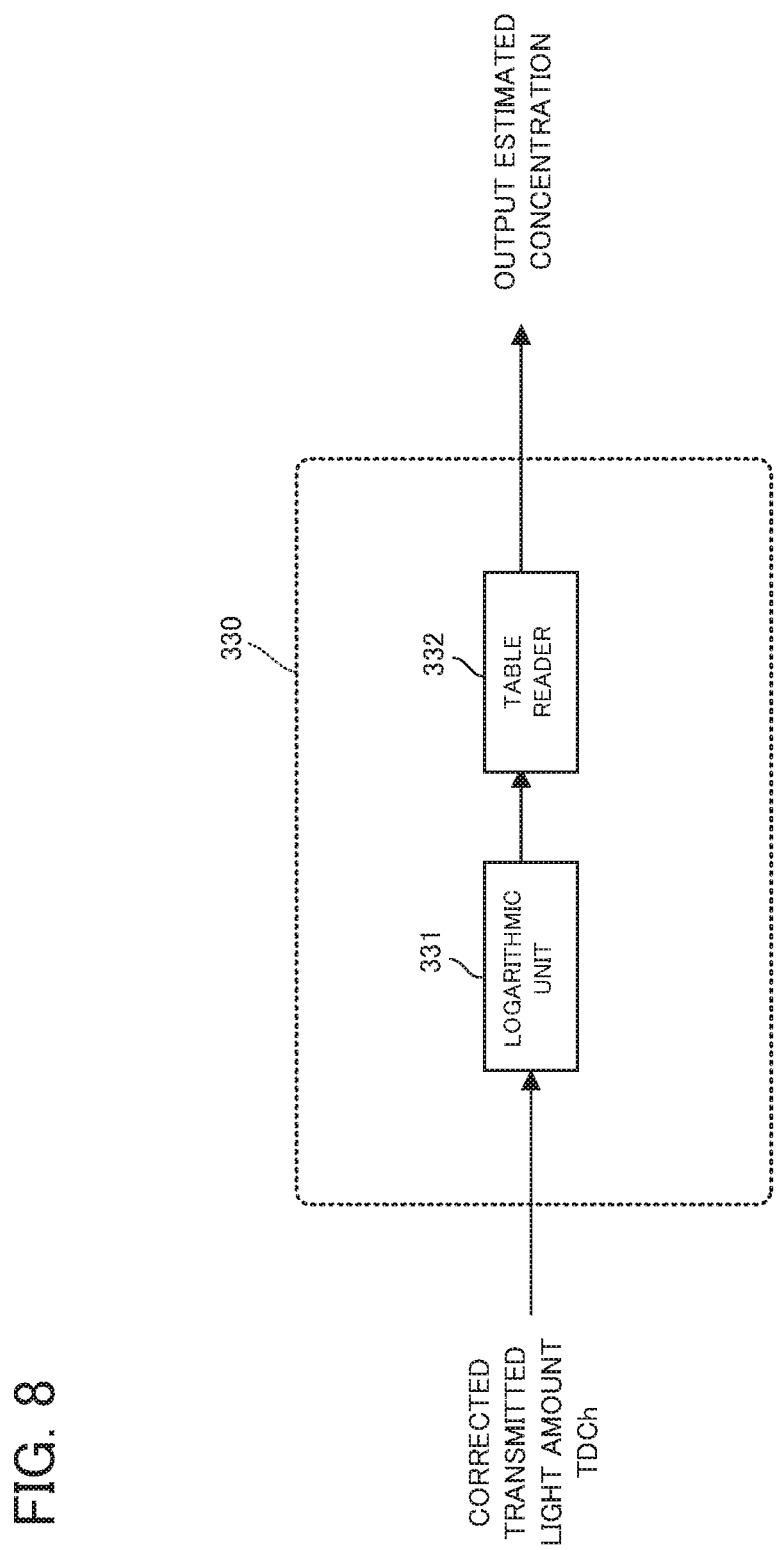
FIG. 8 is a block diagram illustrating a configuration of a concentration converter.

With reference to FIG. 7 and FIG. 8, the configuration and operation of the concentration converter will be explained. FIG. 7 is a graph illustrating a relation between the fluid concentration and the transmitted light amount. FIG. 8 is a block diagram illustrating the configuration of the concentration converter.

As illustrated in FIG. 7, there is such a characteristic that the transmitted light amount TDC exponentially decreases with increasing the fluid concentration. Thus, by using this relation, it is possible to estimate the fluid concentration from the transmitted light amount TDC.

As illustrated in FIG. 8, the concentration converter 330 is provided with a logarithmic unit 331 and a table reader 332.

The logarithmic unit 331 is configured to perform logarithmic transformation (in other words, linearization) of the corrected transmitted light amount TDCh inputted, and to output a logarithm thereof. The logarithmic transformation makes it possible to prevent a conversion error, which can be generated on the table reader 332.

The table reader 332 is configured to store therein a table that is derived from the relation between the transmitted light amount TDC and the fluid concentration, which is illustrated in FIG. 7, and to calculate and output the estimated concentration from the logarithm of the corrected transmitted light amount TDCh. For the calculation of the estimated concentration, instead of the table reading, another method such as calculation using a polynomial expression can be also used.

Effect of First Practical Example

Figure 9:
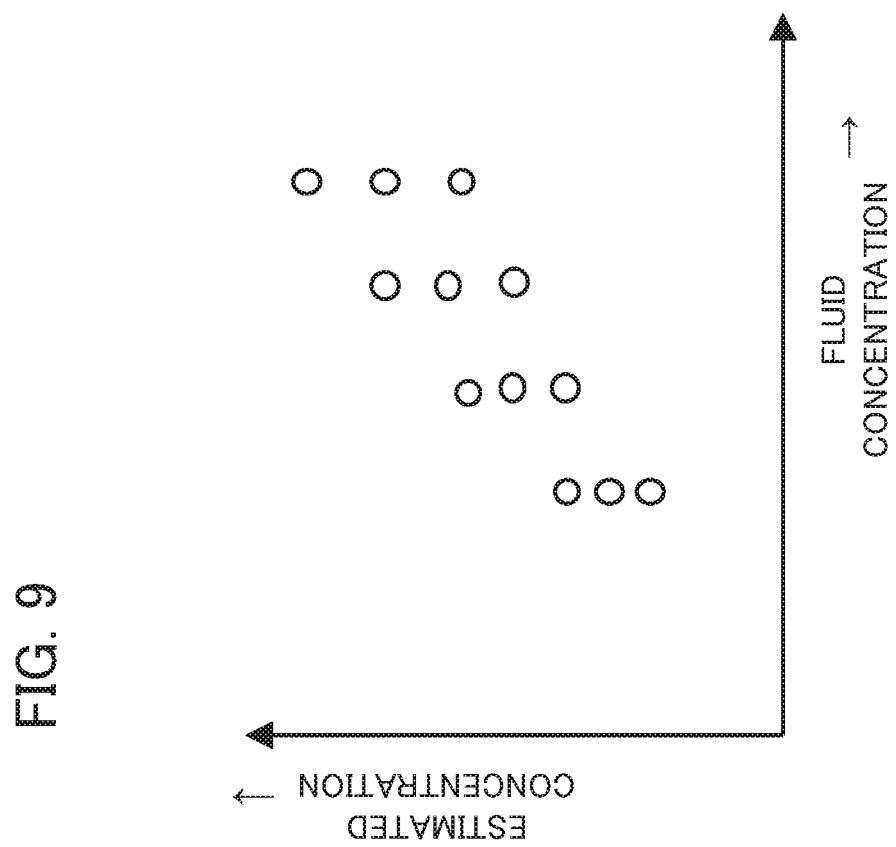
FIG. 9 is a graph illustrating an estimation error of the concentration according to a comparative example.
Figure 10:
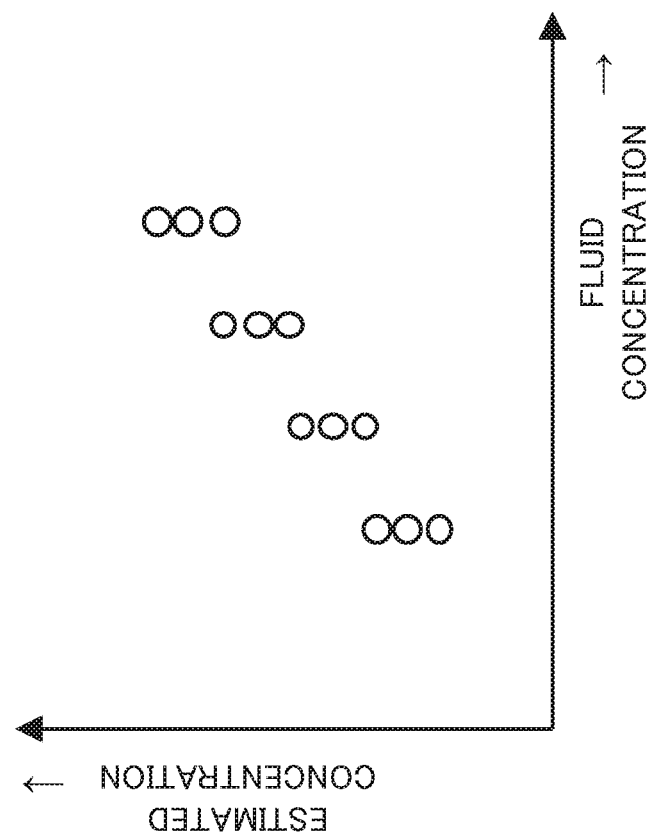
FIG. 10 is a graph illustrating an estimation error of the concentration according to the first practical example.

Next, with reference to FIG. 9 and FIG. 10, a technical effect obtained by the fluid measuring apparatus according to the first practical example will be explained. FIG. 9 is a graph illustrating an estimation error of the concentration according to a comparative example. FIG. 10 is a graph illustrating an estimation error of the concentration according to the first practical example.

As explained above, if the backflow occurs in the target 200 to be measured, there may be an error in the estimated concentration. Particularly in the artificial dialysis apparatus, if a blood removing needle is thin in diameter, if the pump has a high number of revolutions, and if a set flow volume is high, then, a backflow amount increases and the estimation error of the concentration further increases, which has been experimentally confirmed.

As illustrated in FIG. 9, unlike the first practical example, if the transmitted light amount TDC is not corrected by detecting the backflow, the occurrence of the backflow increases dispersion of the estimated concentration.

In contrast, in the first practical example, if the backflow is detected, the process of replacing the transmitted light amount TDC by the past average value TDCLp is performed. As a result, a waveform of the corrected transmitted light amount TDCh is not disturbed even in a backflow occurrence section (e.g. refer to FIG. 6, etc.).

As illustrated in FIG. 10, if the transmitted light amount TDC is corrected by detecting the backflow, the dispersion of the estimated concentration is reduced, and satisfactory characteristics are shown.

As explained above, according to the fluid measuring apparatus in the first practical example, even if the backflow temporarily occurs in the fluid, the fluid concentration can be accurately estimated.

Second Practical Example

Figure 11:
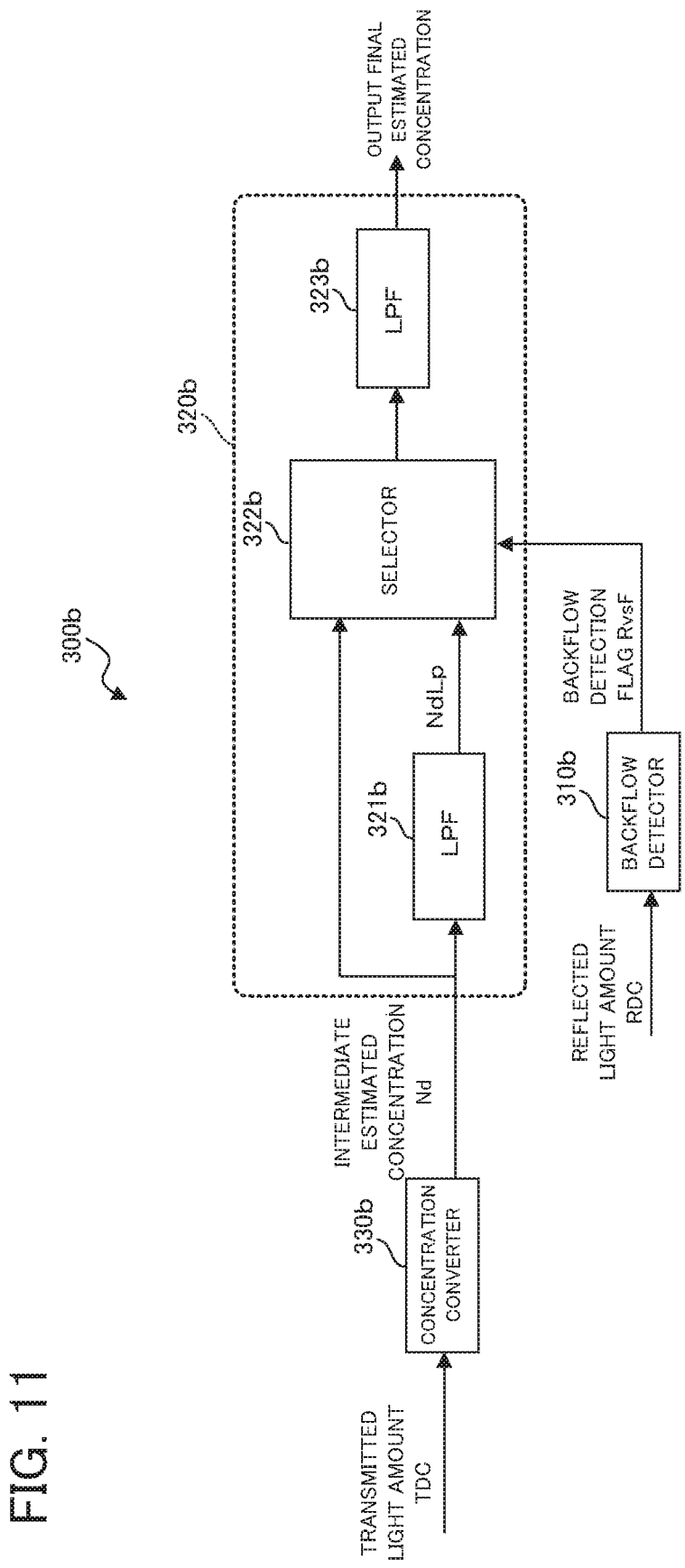
FIG. 11 is a block diagram illustrating a configuration of a backflow correction concentration estimator according to a second practical example.

A fluid measuring apparatus according to a second practical example will be explained with reference to FIG. 11. FIG. 11 is a block diagram illustrating a configuration of a backflow correction concentration estimator according to the second practical example.

The second practical example is different only in the configuration and operation of the backflow correction concentration estimator from the first practical example, and is substantially the same as the first practical example in the other part. Thus, hereinafter, the different part from that of the first practical example will be explained in detail, and an explanation of the same part will be omitted as occasion demands.

As illustrated in FIG. 11, a backflow correction concentration estimator 300b according to the second practical example is provided with a backflow detector 310b, a correction processor 320b, and a concentration converter 330b. Particularly in the second practical example, the concentration converter 330b is provided before the correction processor 320b, and the concentration is firstly estimated before the correction process.

The concentration converter 330b is configured to convert the inputted transmitted light amount TDC to an intermediate estimated concentration Nd. The conversion is performed in the same procedure as that of the concentration conversion illustrated in FIG. 7 and FIG. 8. Moreover, the backflow detector 310b is configured to detect the occurrence of the backflow by comparing the magnitude between the reflected light amount RDC and the threshold value Thld, and to output the backflow detection flag RvsF. The detection of the backflow is also performed in the same procedure as that explained in FIG. 4.

The intermediate estimated concentration Nd is averaged on a LPF 321b to obtain NdLp. The intermediate estimated concentration Nd or the NdLp is selectively outputted in accordance with the backflow detection flag RvsF on a selector 322b, and is further averaged on a LPF 323b. It is then outputted as a final estimated concentration. Specifically, if the backflow detection flag RvsF=1, it is determined that the backflow occurs, and the averaged NdLp is selectively outputted. On the other hand, if the backflow detection flag RvsF=0, it is determined that the backflow does not occur, and the Nd before the averaging is selectively outputted.

As a result, the final estimated concentration can be obtained as a more accurate estimated value even in the backflow occurrence section, and concentration estimation characteristics are satisfactory characteristics with less dispersion.

As explained above, on the fluid measuring apparatus according to the second practical example, unlike the first practical example, not the transmitted light amount TDC but the estimated concentration is corrected. Even in this case, as in the first practical example, it is possible to reduce an influence by the occurrence of the backflow, and it is possible to accurately estimate the fluid concentration.

Third Practical Example

Figure 12:
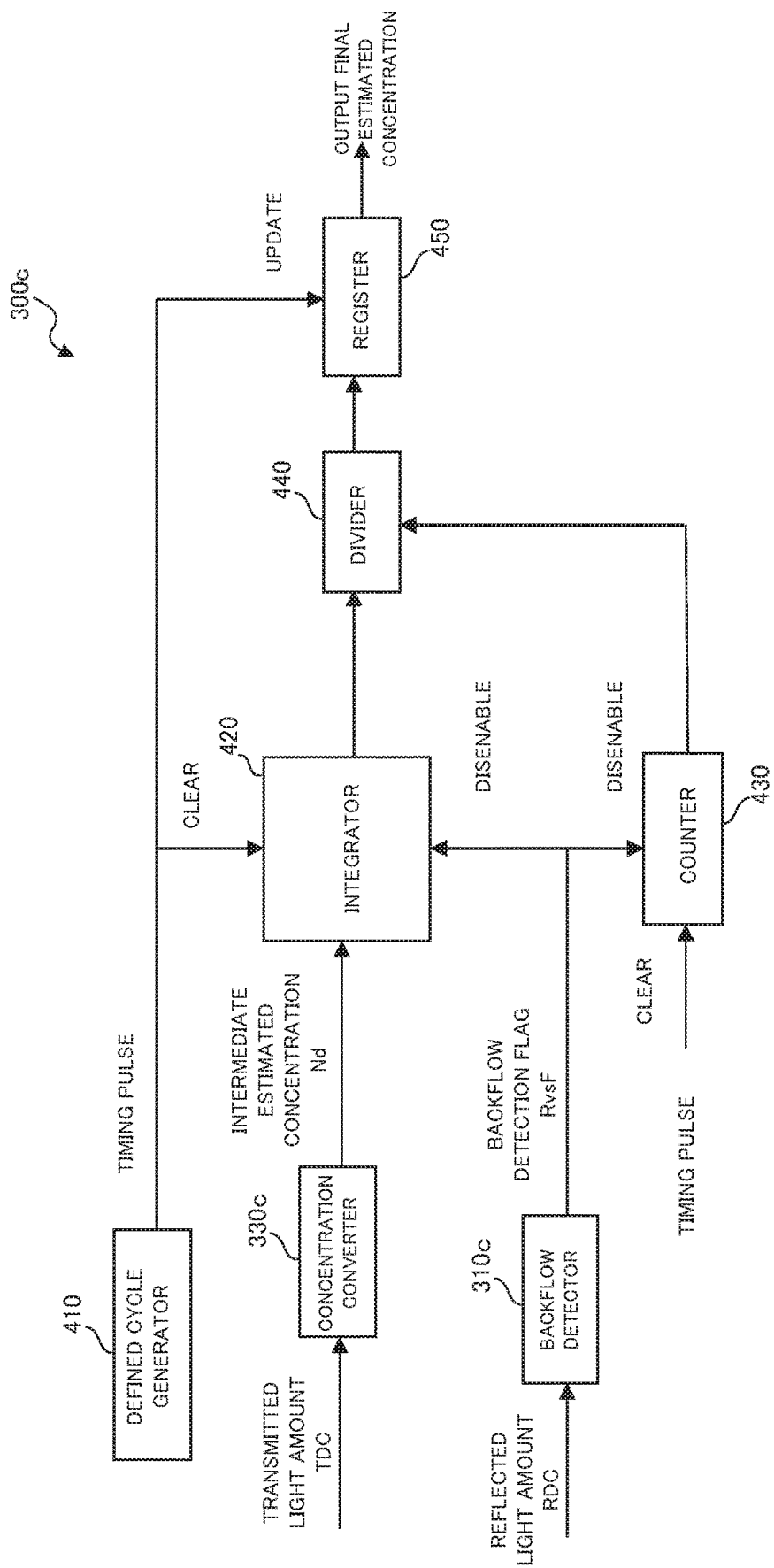
FIG. 12 is a block diagram illustrating a configuration of a backflow correction concentration estimator according to a third practical example.

A fluid measuring apparatus according to a third practical example will be explained with reference to FIG. 12. FIG. 12 is a block diagram illustrating a configuration of a backflow correction concentration estimator according to the third practical example.

The third practical example is different only in the configuration and operation of the backflow correction concentration estimator from the first and second practical examples, and is substantially the same as the first and second practical examples in the other part. Thus, hereinafter, the different part from those of the first and second practical examples will be explained in detail, and an explanation of the same part will be omitted as occasion demands.

As illustrated in FIG. 12, a backflow correction concentration estimator 300c according to the third practical example is provided with a backflow detector 310c, a concentration converter 330c, a defined cycle generator 410, an integrator 420, a counter 430, a divider 440, and a register 450.

The backflow detector 310c is configured to detect the occurrence of the backflow by comparing the magnitude between the reflected light amount RDC and the threshold value Thld, and to output the backflow detection flag RvsF. Moreover, the concentration converter 330c is configured to convert the inputted transmitted light amount TDC to the intermediate estimated concentration Nd.

The integrator 420 is configured to integrate the inputted intermediate estimated concentration Nd, and to clear an integrated value in accordance with a timing pulse generated by the defined cycle generator 410. The integrator 420 performs the integration every time the intermediate estimated concentration Nd is updated, but the integration is prohibited if the backflow detection flag RvsF=1, i.e., if the backflow is detected. Thus, the integration is performed only on the intermediate estimated concentration Nd in a period in which the backflow is not detected. An output of the integrator 420 is inputted to a numerator side of the divider 440.

On the other hand, a counter value, which is an output of the counter 430, is inputted to a denominator side of the divider 440. The counter value is incremented every time the intermediate estimated concentration Nd is updated, and is initialized by the timing pulse generated by the defined cycle generator 410. If the backflow detection flag RvsF=1, i.e., if the backflow is detected, the increment of the counter value is prohibited. As a result, the counter value matches the number of effective data included in a defined cycle (in other words, the number of data integrated on the integrator 420), at a time point of the generation of the timing pulse.

As a result, the divider 440 may divide an integrated value of the effective data (i.e., a numerator) by the number of the effective data (i.e., a denominator), thereby calculating an average value of the effective data. The average value of the effective data is held on the register 450 in each cycle in which the timing pulse is generated. The register 450 is configured to output the average value of the effective data as the final estimated concentration. By virtue of such a configuration, data in the backflow occurrence section is removed from the integration, and estimation characteristics of the final estimated concentration are satisfactory characteristics with less dispersion.

As explained above, on the fluid measuring apparatus according to the third practical example, the average value of the data in the period in which the backflow does not occur is outputted as the final estimated concentration. Thus, as in the first and second practical examples, it is possible to reduce the influence by the occurrence of the backflow, and it is possible to accurately estimate the fluid concentration.

The present invention is not limited to the aforementioned embodiments and examples, but various changes may be made, if desired, without departing from the essence or spirit of the invention which can be read from the claims and the entire specification. A fluid measuring apparatus that involve such changes is also intended to be within the technical scope of the present invention.

DESCRIPTION OF REFERENCE NUMERALS AND LETTERS

110 laser drive unit
120 semiconductor laser
131 first light receiving element
132 second light receiving element
141 first I-V converter
142 second I-V converter
151 first LPF amplifier
152 second LPF amplifier
161 first A/D converter
162 second A/D converter
200 target to be measured
300 backflow correction concentration estimator
310 backflow detector
320 correction processor
330 concentration converter

The invention claimed is:

1. A fluid measuring apparatus comprising:
an irradiating device configured to irradiate a fluid with light;
a light receiving device configured to receive light scattered by the fluid;
a detecting device configured to detect a backflow of the fluid on the basis of a received light signal of said light receiving device, wherein said detecting device is configured to detect the backflow of the fluid if a change amount of received light intensity indicated by the received light signal is greater than or equal to a predetermined value; and
a calculating device configured to calculate estimated concentration information indicating a concentration of the fluid, on the basis of a detection result of said detecting device and the received light signal of said light receiving device.

2. The fluid measuring apparatus according to claim 1, wherein said calculating device is configured (i) to calculate the estimated concentration information on the basis of the received light signal in a period other than a backflow period in which the backflow of the fluid is detected, and (ii) to calculate the estimated concentration information on the basis of a corrected signal obtained by correcting the received light signal in the backflow period.

3. The fluid measuring apparatus according to claim 2, wherein said light receiving device includes: a first light receiving element placed to receive mainly transmitted light, which is transmitted through the fluid; and a second light receiving element placed to receive mainly reflected light, which is reflected by the fluid.

4. The fluid measuring apparatus according to claim 1, wherein said calculating device is configured to calculate first concentration information on the basis of the received light signal and calculate second concentration information by correcting the first concentration information, (i) to output the first concentration information as the estimated concentration information in a period other than a backflow period in which the backflow of the fluid is detected, and (ii) to output the second concentration information as the estimated concentration information in the backflow period.

5. The fluid measuring apparatus according to claim 4, wherein said light receiving device includes: a first light receiving element placed to receive mainly transmitted light, which is transmitted through the fluid; and a second light receiving element placed to receive mainly reflected light, which is reflected by the fluid.

6. The fluid measuring apparatus according to claim 1, wherein said calculating device is configured (i) to calculate first concentration information based on the received light signal, a plurality of times, in a predetermined period, and (ii) to calculate an average value of the first concentration information calculated in a period other than a backflow period in which the backflow of the fluid is detected, and (iii) to output the average as the estimated concentration information in the predetermined period.

7. The fluid measuring apparatus according to claim 6, wherein said light receiving device includes: a first light receiving element placed to receive mainly transmitted light, which is transmitted through the fluid; and a second light receiving element placed to receive mainly reflected light, which is reflected by the fluid.

8. The fluid measuring apparatus according to claim 1, wherein said light receiving device includes: a first light receiving element placed to receive mainly transmitted light, which is transmitted through the fluid; and a second light receiving element placed to receive mainly reflected light, which is reflected by the fluid.

9. The fluid measuring apparatus according to claim 8, wherein said detecting device is configured to detect the backflow of the fluid on the basis of the received light signal corresponding to the reflected light.

10. The fluid measuring apparatus according to claim 9, wherein said calculating device is configured to calculate the estimated concentration information on the basis of the detection result of said detecting device and the received light signal corresponding to the transmitted light.

11. The fluid measuring apparatus according to claim 8, wherein said calculating device is configured to calculate the estimated concentration information on the basis of the detection result of said detecting device and the received light signal corresponding to the transmitted light.

* * * * *